(12) United States Patent
Ball et al.

(10) Patent No.: US 7,318,859 B2
(45) Date of Patent: Jan. 15, 2008

(54) MODULAR ADSORBENT FILTERS

(75) Inventors: Earl R. Ball, Middletown, DE (US); Edwin G. Dauber, Chesapeake City, MD (US); Darlene K. Gorton, Elkton, MD (US); Rajan H. Gidumal, Newark, DE (US)

(73) Assignee: Gore Enterprise Holdings, Newark, DE (US)

( * ) Notice: Subject to any disclaimer, the term of this patent is extended or adjusted under 35 U.S.C. 154(b) by 367 days.

(21) Appl. No.: 10/968,443

(22) Filed: Oct. 18, 2004

(65) Prior Publication Data

US 2006/0081128 A1 Apr. 20, 2006

(51) Int. Cl.
*B01D 53/02* (2006.01)

(52) U.S. Cl. .............. 96/121; 96/135; 96/147; 96/154; 55/385.6; 360/97.02

(58) Field of Classification Search ............. 96/108, 96/121, 132, 134, 135, 147, 154; 55/385.6; 360/97.02

See application file for complete search history.

(56) References Cited

U.S. PATENT DOCUMENTS

| | | | |
|---|---|---|---|
| 3,953,566 A | 4/1976 | Gore | 260/288 |
| 4,633,349 A | 12/1986 | Beck et al. | 360/97 |
| 4,830,643 A | 5/1989 | Sassa et al. | 55/316 |
| 4,857,087 A | 8/1989 | Bolton et al. | 55/385.6 |
| 4,863,499 A | 9/1989 | Osendorf | 55/316 |
| 4,902,423 A | 2/1990 | Bacino | 210/500.36 |
| 4,985,296 A | 1/1991 | Mortimer, Jr. | 428/220 |
| 5,030,260 A | 7/1991 | Beck et al. | 55/316 |
| 5,124,856 A | 6/1992 | Brown et al. | 360/97.03 |
| 5,406,431 A | 4/1995 | Beecroft | 360/97.02 |
| 5,417,743 A | 5/1995 | Dauber | 96/13 |
| 5,447,695 A | 9/1995 | Brown et al. | 422/171 |
| 5,500,038 A | 3/1996 | Dauber et al. | 96/135 |
| 5,538,545 A | 7/1996 | Dauber et al. | 96/153 |
| 5,593,482 A | 1/1997 | Dauber et al. | 96/135 |
| 5,997,614 A | 12/1999 | Tuma et al. | 96/4 |
| 6,146,446 A | 11/2000 | Tuma et al. | 95/90 |
| 6,214,095 B1 * | 4/2001 | Logan et al. | 96/147 |
| 6,238,467 B1 | 5/2001 | Azarian et al. | 96/135 |
| 6,266,208 B1 | 7/2001 | Voights | 360/97.02 |
| 6,296,691 B1 | 10/2001 | Gidumal | 96/17 |
| 6,395,073 B1 | 5/2002 | Dauber | 96/134 |
| 6,491,741 B2 | 12/2002 | Tuma et al. | 95/90 |
| 6,683,746 B1 | 1/2004 | Kuroki et al. | 360/97.02 |
| 6,712,887 B2 | 3/2004 | Ueki et al. | 96/134 |
| 6,824,595 B2 | 11/2004 | Ueki et al. | 96/134 |
| 6,936,093 B2 | 8/2005 | Isogawa et al. | 96/55 |
| 2005/0036232 A1 | 2/2005 | Macpherson | 360/97.02 |

FOREIGN PATENT DOCUMENTS

JP 4-323007 11/1992

* cited by examiner

*Primary Examiner*—Robert A Hopkins
(74) *Attorney, Agent, or Firm*—Richard W. Ellis

(57) ABSTRACT

A compact sorbent filter for selectively sorbing contaminants and method of removing contamination from an enclosure with a filter is disclosed. Filters of the present invention comprise two or more modular adsorbent units that can be foldably connected and possibly symmetric about one or more axis.

In another aspect, the invention provides a laminar support, having at least one edge, a first side and a second side opposite the first side, wherein the article is folded along the fold line about the at least one edge of the laminar support such that the first adsorbent assembly is adjacent to the first side of the laminar support and the second adsorbent assembly is adjacent to the second side of the laminar support. In this aspect, the laminar support may be exposed or covered by the adjacent adsorbent assemblies.

38 Claims, 12 Drawing Sheets

MODULAR ADSORBENT FILTERS

FIELD OF THE INVENTION

This invention relates to devices for filtering or removing contaminants from a confined environment, such as gaseous contaminants in electronic or optical devices (e.g., disk drives as used in computers and other data storage applications).

BACKGROUND OF THE INVENTION

Many enclosures that contain sensitive instrumentation or equipment must maintain very clean environments in order to operate properly. Examples include: enclosures with sensitive optical surfaces or electronic connections that are sensitive to particulates and gaseous contaminants which can interfere with mechanical or electrical operation; data recording devices, such as computer hard disk drives that are sensitive to particles, organic vapors, moisture, and corrosive vapors; and electronic control boxes such as those used in automobiles that are sensitive to moisture buildup and corrosion as well as contamination from fluids and vapors. Contamination in such enclosures originates from both inside and outside the enclosures. For example, in computer hard drives, damage may result from external contaminates as well as out-gassing from internal components.

One serious contamination-related failure mechanism in computer disk drives is static friction or "stiction." Stiction is the adhesion of a drive head to a disk while the disk is stopped. Newer high-density disks are more sensitive to contamination-related stiction because they are smoother and only thin layers of lubricants are used. Contaminants on the disk change the surface energy and the adhesive forces between the disk and the head, which causes stiction. Also, vapors that condense in the gap between the head and disk can cause stiction. Further exacerbating these effects, new disk drives have smaller, low energy motors with lower torque.

In addition, disk drives must be protected against a large number of contaminants in the surrounding environment. This is true for drives used in small to medium sized computer systems which may not be used in the typical data processing environment and is especially true in drives that are removable and transportable to any environment, such as disk drives that are used in Personal Computer Memory Card International Association (PCMCIA) Slots, iPod® music devices, and in cell phones.

One successful approach to controlling contamination has been the use of sorbent filters. Sorbent filters must keep the enclosures free of contamination from both internal and external sources. In addition to requirements to provide cleaner environments, filters must be made smaller to fit into small enclosures. An excellent example of space constraints in modern electronic components is in the area of computer disk drives. Today, PCMCIA computer disk drives or drives with 1.8" (45 mm) disks have gigabytes of storage capacity and are only approximately 5 cm wide and 7.5 cm long. Type 3 PCMCIA drives have a maximum thickness of 10.5 mm, Type 2 drives have a maximum thickness of 5 mm, and Type I drives have a maximum thickness of 3.3 mm. Additionally even smaller 1.0" (25 mm) and 0.8" (20 mm) drives for camera and cell phone applications are either on or coming to the market.

A commercially successful sorbent filter is disclosed in U.S. Pat. No. 4,830,643 issued to Sassa et al. This patent teaches a sorbent filter where a powdered adsorbent is encapsulated in an expanded PTFE tube. This tube filter is manufactured by W. L. Gore and Associates, Inc., Elkton, Md., and is commercially available under the trademark GORE SORBER® module. While this apparatus is highly effective, the filter is currently available only in large and medium sizes (e.g., filter volumes down to about 3 cc). In its present form, this filter is incapable of fully addressing growing needs for even smaller and more compact sorbent filters containing a higher sorbent density.

Sorbent filter manufacturers have encountered several obstacles in producing very small tube sorbent filters. As tube size (diameter) decreases, filling the tube with sorbent powder becomes more difficult. This problem is compounded by the common use of larger granular sorbent powders commonly used to avoid 'dusting' contamination. It is more difficult to fill the small tube filters without having the powder settle on the external tube surfaces and the seal areas. The powder on the outside of the tube can contaminate the devices near the tube and powder in the seal area can prevent the outer tube from sealing, which may also cause dusting problems through leakage.

Many new applications for sorbent filters require spill proof sorbent materials. However, the use of loose particles in existing filled tube filters, if broken, could spill the loosely packed adsorbent material into the enclosure, damaging the integral components.

Another problem with tubular sorbants is that they require custom automation in production. The rapid development and obsolescence of materials and parts in the disk drive filtration industry makes such custom automation undesirable.

Another sorbent filter commercially available from W. L. Gore & Associates, Inc., called a GORE-TEX® Stand Alone Adsorbent Assembly, consists of a composite sorbent-filled PTFE planar core which is laminated on its top and bottom surfaces with a porous expanded PTFE membrane. This filter fits into slots in an enclosure interior. The sorbent-filled PTFE core can be filled with various sorbent materials selected to adsorb hydrocarbons, moisture, out-gassed plasticizers, corrosives, etc. Although this sorbent assembly provides a low profile compact sorbent assembly, concern has been expressed that the unsealed sides of this device may not provide adequate protection from shedding of sorbent material particles in some applications.

Adsorbent assembly filters manufactured with rotary die cutting equipment and continuous film processes are known. Such equipment is advantageous because it has relatively low set up costs and is highly adaptable. Moreover, continuous film feeding processes greatly reduce part cost.

However, known rotary die cutting equipment imposes significant limitations on adsorbent assembly and adsorbent breather filter design. For example, such equipment is capable of cutting only relative thin adsorbents. This substantially limits total adsorbent capacity for an adsorbent assembly. Thicker adsorbents have also required complex molding of the porous membrane cover to cover and seal the adsorbent within the filter. There are also some other limitations in part designs (such as exposed adhesives), part layers, and the ability to automatically pick and place parts from some rotary processed layouts that can limit the use of these parts. Also there can be limitations on the number of parts per foot that can be made from raw materials that increase per part costs.

Accordingly, there is a need for improved adsorbent assembly and adsorbent breather filters that overcome the foregoing limitations.

SUMMARY

In one aspect, the present invention is an adsorbent assembly for removing contaminants within an enclosure comprising: a first adsorbent disposed on a first substrate and a first porous polymeric layer covering at least a portion of said first adsorbent, the first porous polymeric layer attached to the first substrate around the perimeter of the first adsorbent; and a second adsorbent assembly comprising a second adsorbent disposed on a second substrate and a second porous polymeric layer covering at least a portion of said second adsorbent, the second porous polymeric layer attached to the second substrate around the perimeter of the second adsorbent; in which the first adsorbent assembly and the second adsorbent assembly are foldably connected.

In another aspect, the invention provides a fold line between the first and second adsorbent assemblies.

In still another aspect, the first and second adsorbent assemblies are symmetric about the fold line.

In yet another aspect, the invention provides an adsorbent assembly where the article is folded about the fold line.

In another aspect, the invention provides a laminar support, having at least one edge, a first side and a second side opposite the first side, wherein the article is folded along the fold line about the at least one edge of the laminar support such that the first adsorbent assembly is adjacent to the first side of the laminar support and the second adsorbent assembly is adjacent to the second side of the laminar support. In this aspect, the laminar support may be exposed or covered by the adjacent adsorbent assemblies.

In a further aspect, the invention provides for the laminar support to be comprised of an adhesive on at least one side.

In still another aspect, the invention provides a folded assembly where the first substrate is adjacent to the second substrate.

In a further aspect, the invention provides a clamp for holding the first substrate adjacent to the second substrate.

In still another aspect, the invention provides an assembly wherein the first substrate and second substrate are continuous.

In yet another aspect, the invention has the first and second porous polymeric layers continuous.

In still another aspect, the invention provides an assembly, wherein at least one of the first substrate and second substrate comprises an adhesive on at least one side.

In yet another aspect, the article is folded such that the first substrate is adjacent to the second substrate and at least a portion of said adhesive is exposed.

In a further aspect, the adhesive is selected from the group consisting of: pressure sensitive adhesive, hot melt adhesives, thermoplastic or thermoset materials, UV curable adhesives, air curable adhesives, moisture curable adhesives, and multiple part adhesives.

In another aspect, at least one of the first substrate and second substrate comprise a double sided adhesive.

In still another aspect, the invention provides a hole or inlet port disposed within the first substrate.

In yet another aspect, the invention further comprises a diffusion tube disposed over the inlet port.

In a still further aspect, the invention includes an air-impermeable layer covering one or more adsorbent assembly. In this aspect, the impermeable layer may include one or more perforations therein.

In another aspect, the invention provides for at least one of the first polymeric layer and second polymeric layer to be comprised of a porous polymeric membrane. In this aspect, the porous polymeric membrane may be hydrophobic. More preferably, the porous polymeric membrane comprises PTFE.

In a further aspect, the invention provides for at least one of the first polymeric layer and second polymeric layer to be comprised of a laminate of a porous polymeric membrane and a support.

In yet another aspect, the invention provides that at least one of the first adsorbent and second adsorbent is comprised of a chemisorbent.

In still another aspect, the invention provides that at least one of the first adsorbent and second adsorbent is comprised of a physiosorbent.

In another aspect, the invention provides for the first adsorbent and second adsorbent to be the same material.

In still another aspect, the invention further comprises at least one additional adsorbent assembly comprising at least one additional adsorbent disposed on at least one additional substrate and at least one additional porous polymeric layer covering at least a portion of the at least one additional adsorbent, the at least one additional porous polymeric layer attached to the at least one additional substrate around the perimeter of the at least one additional adsorbent, wherein the at least one additional adsorbent assembly is foldably connected to the first or second adsorbent assembly.

In a further aspect, the invention is folded along a fold line in application to fit into a corner of an enclosure.

In still another aspect, the adsorbent is shaped on at least one surface.

In yet another aspect, the adsorbent further comprises at least one air permeable flow layer.

In another aspect, the invention provides an adsorbent media comprising an adsorbent filled polymer layer. In this aspect, the adsorbent comprises a mixture of adsorbent and PTFE.

In yet another aspect, either or both of the adsorbent layers comprises multiple adsorbents.

In still another aspect, either or both of the adsorbent layers may comprise multiple adsorbent layers. In this aspect, the adsorbent layers may be shaped to provide grooves, bumps, or is otherwise contoured to provide a non-flat surface, or air permeable flow layers to improve adsorption performance of the adsorbent layers.

In another aspect, the adsorbent assembly comprises: a rectangular pressure sensitive adhesive layer having an axis of symmetry bisecting said pressure sensitive adhesive layer into a first half and a second half; a first adsorbent having a first surface in contact with the first half of said pressure sensitive adhesive layer, said first adsorbent having at least one remaining surface; a second adsorbent having a first surface in contact with the second half of said pressure sensitive adhesive layer, said second adsorbent having at least one remaining surface; a porous polymeric membrane filtration media comprising PTFE attached to the pressure sensitive adhesive layer around the perimeter of the first adsorbent and the second adsorbent such that said polymeric membrane filtration media covers said remaining surfaces of the of the first adsorbent to form a first adsorbent unit and said polymeric membrane filtration media covers said remaining surfaces of the of the second adsorbent to form a second adsorbent unit; and at least one perforation disposed along the axis of symmetry such that the first adsorbent unit is foldably connected to the second adsorbent unit.

In another aspect, a method of assembling an adsorbent article is provided comprising the steps of: providing a substrate having a top surface and a bottom surface, said substrate having a fold line therein to form a first panel having a top surface and a bottom surface and a second panel having a top surface and a bottom surface, the first panel foldably connected to the second panel; providing a first adsorbent disposed on the top surface of the first panel and a second adsorbent disposed on the top surface of the second panel; covering at least a portion of the first adsorbent with a first porous polymeric layer, said first porous polymeric layer being attached to the top surface of the first panel around the perimeter of the first adsorbent; covering at least a portion of the second adsorbent with a second porous polymeric layer, said second porous polymeric layer being attached to the top surface of the second panel around the perimeter of the second adsorbent; and folding the substrate at the fold line such that the bottom of the first panel is adjacent to the bottom of the second panel.

In still another aspect, the adsorbent comprises an additional nonpermeable outer layer and mounting adhesive to effect an outside mount version of the part as an assembly covering a hole or holes in the enclosure wall or surface.

In another aspect, the outside mount adsorbent assembly further comprises a hole or aperture in the outer nonpermeable layer and polymer layer or layers to effect an outside mount version with a breather or vent functionality.

In yet another aspect, the outside mount adsorbent breather filter further comprises the additional layers to form a diffusion tube within the outside mount adsorbent breather filter.

In a further aspect, the invention comprises multiple adsorbent assemblies foldably connected with multiple hinges.

In another aspect, the adsorbent assembly with multiple assemblies further comprises a hole in the polymer film layer to effect an adsorbent breather filter with one or more active breather or vent panels.

In still another aspect, the adsorbent assembly comprises: a first adsorbent assembly comprising a first adsorbent disposed on a first substrate and a first porous polymeric layer covering at least a portion of said first adsorbent, the first porous polymeric layer attached to the first substrate around the perimeter of the first adsorbent; and a second adsorbent assembly comprising a second adsorbent disposed on a second substrate and a second porous polymeric layer covering at least a portion of said second adsorbent, the second porous polymeric layer attached to the second substrate around the perimeter of the second adsorbent; in which the first substrate is adjacent to the second substrate. In this aspect, a laminar support having at least one edge may be disposed between said first adsorbent assembly and said second adsorbent assembly. The edge of the laminar support may be exposed or be covered by the adjacent adsorbent assemblies.

In a further aspect, the assembly above provides for at least one of the first substrate and second substrate to comprise an adhesive on at least one side.

In another aspect, the assembly above provides for at least one of the first substrate and second substrate to comprise a double sided adhesive.

BRIEF DESCRIPTION OF THE DRAWINGS

The operation and construction of the present invention should become apparent from the following description when considered in conjunction with the accompanying drawings, in which.

DETAILED DESCRIPTION

Figure 1A:
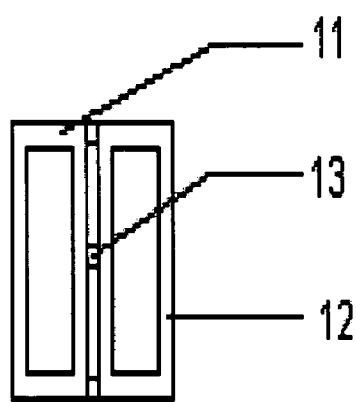
FIG. 1A is a top view of a first embodiment of the filter unit of the present invention.

The present invention is a compact sorbent filter capable of removing vapor contaminants from within an enclosure to protect sensitive equipment present within the interior of the enclosure. The present invention also provides a method for sorbing contaminates from an enclosure with a sorbent filter and more particularly, removing contaminates from a disk drive enclosure. Specifically, the invention provides a compact adsorbent filter that includes two or more foldably connected adsorbent assemblies. The sorbent filter has exceptional adsorbent capacity and is readily manufacturable on rotary die cutting equipment.

The present invention can also incorporate an adsorbent breather filter (with or without an incorporated diffusion tube) foldably connected to an adsorbent assembly filter. This and other embodiments described herein provide easy automated installation of the filters within the enclosure device. The present invention may also include an air-impermeable layer to mount from the outside of the enclosure and cover existing holes into the enclosure, for instance, in hard disk drives, clock head holes and holes for writing to the disk. Thus, the invention not only enables more adsorbent media to be provided in a single easily die cut part, it can also add flexibility and application enhancement features to an adsorbent filter device.

The present invention can also incorporate filter layers that add significant particle filtration functionality to the filter. This increases the multifunctionality of the filter which is important in space constrained environments. The filter layers can filter both the incoming air through an active or breather filter section of the filter and in air circulating or recirculating around inside the enclosure.

The thin filter layer 14 may comprise any porous material that allows vapor contaminants to diffuse through to the adsorbent media while thoroughly retaining the adsorbent material within. Appropriate filter materials can be chosen by one of skill in the art, depending upon the adsorbent type and form chosen. Suitable filter layer materials may include: polymeric non-shedding filter paper or laminated filter material, porous membrane of polypropylene, nylon, a composite of polycarbonate and polyester, mixed cellulose esters, cellulose triacetate, or porous laminate thereof.

PTFE membrane filter materials can advantageously be used to cover the adsorbent material and act as filtration membranes. As is disclosed in U.S. Pat. No. 3,953,566 to Gore, incorporated by reference, PTFE provides a number of processing advantages, such as being formable in extremely thin dimensions while remaining coherent and pin-hole free. PTFE can be made into wide widths that can be slit or extruded to the desired width.

An exemplary membrane could be made in accordance with U.S. Pat. No. 3,953,566. Such a membrane can have a filtration efficiency of 99.97% at 0.3 microns sized particles and a permeability or face velocity of 7 feet/minute (3.56 cm/sec) at 0.5 inches (1.27 cm) of water pressure. The membrane is commercially available in finished filter form from W. L. Gore and Associates, Inc.

A preferred filter media to encapsulate the adsorbent layer is a layer of expanded PTFE membrane made in accordance to U.S. Pat. No. 4,902,423 issued to Bacino et al. incorporated by reference. This filter media may be structurally supported by a layer of woven, nonwoven, or expanded porous material, such as polyester, polypropylene, polyamide, etc. This filter media has several advantages.

Most significantly, the filter media can be made very highly permeable, with resistances to air flow of less than 0.5 mm $H_2O$ @ 10.5 feet per minute (3.2 meters per minute) and still retain adsorbent particulate within the filter. The particle filtration efficiency of this highly expanded membrane as measured on a TSI 8160 efficiency test rig available from TSI Inc., in Minnesota, is also very good (e.g. in excess of 55% at 0.3 μm) which provides good particle filtration along with the adsorbent retainment. If used, a preferred support layer is a Reemay 2014 polyester nonwoven, 1.0 oz/yd$^2$ available from Reemay, Inc., Old Hickory, Tenn. Use of such a membrane or laminate can add significant particle filtration functionality to the adsorbent functionality of the filter particularly in the recirculating filtration functionality of the part.

An additional value of using such a membrane is that it can be made extremely thin, possibly less than 0.001" (0.025 mm). This can be of significant importance when filters are desired in very small devices such as the 0.85" hard disk drives that may be used in some cell phone applications.

A second preferred filter media to cover or encapsulate the adsorbent layer, and more preferably to be used in the embodiments with a recirculation filter, is a layer of an electrostatic triboelectret material available in finished filter form from W. L. Gore and Associates, Inc. under the trademark GORE-TRET® recirculation filters. Advantages of this media are that it is very efficient (e.g., in excess of 90% @ 0.3 micron) and also very permeable (e.g., less than 1 mm $H_2O$ at 10.5 fpm or 3.2 m/min). This media may lose its charge when washed with deionized water; however, it immediately regains its charge upon drying due to the triboelectric effect of a mix of dissimilarly charged fibers.

Other filter materials can also be used. They could be other electrets or other triboelectret materials that have high efficiency and low resistances to airflow. They could also be other filter papers or filter membranes such as polypropylene membranes or cast polymeric membranes or some combination of filter materials. Different filter materials with different properties can be used in the different embodiments of the invention wherever filter layers are used and/or optionally used depending upon the required performance.

An outer protective layer can also be used to add durability to the filter and to contain any protruding fibers from either the triboelectret type filter media or the filter support media for the membrane filter media. Typically, this would be an extruded or expanded plastic material such as polypropylene, polyethylene, polyamide, polyester, etc. A preferred material is a Delnet 0707 expanded polypropylene material available from DelStar Technology, Inc., Middletown, Del.

Using PTFE membranes as a filter material over the adsorbent layers imparts a number of advantages to this improved filter construction. First, PTFE is hydrophobic. Some adsorbents used in the industry use a water-soluble salt such as a potassium carbonate to impregnate a physical adsorbent such as an activated carbon to provide a chemical adsorbent with a large active surface area. However, the water-soluble chemi-sorbent salts are removed if the filter is washed. By covering the adsorbent media with the PTFE membrane, the final part is waterproof and washable; water can come into contact with the part and not penetrate to the adsorbent.

Washability is important because ionic contamination is a major concern for corrosion susceptible apparatus such as computer disk drives. Ions of concern, such as chlorine and sulfur dioxide, are readily soluble in water, so washing with deionized water has become routine for many components used within a drive. Also, reworking of drives that initially fail certification is common in the industry and often washing the drive housing or components is included in reworking. Thus, embodiments utilizing PTFE filter layers to encapsulate the adsorbent allows use of water soluble, salt treated adsorbents or adsorbent treatments and can withstand washing without losing adsorbent effectiveness. And reworking can be done without having to remove the adsorbent filter from the housing.

Filters in accordance with the present invention are not only low in particulation, outgassing, and nonvolatile residues. The filters may also be washable in some embodiments. Washing with deionized water to remove surface ionic contamination and particulation improves the filters' suitability for those applications requiring such cleanliness, such as in computer disk drives. The filters may be washed without washing out beneficial treatments such as salts, which remove acid gases from the air streams. This washability is accomplished by using hydrophobic filter materials (along with air-impermeable layers such as adhesives, etc.) to surround the adsorbent layers. "Hydrophobic" as used in this application means the filter materials have a water (or water with surfactant if one is used) entry pressure sufficient to withstand the conditions of conventional washing steps, such as heating, stirring, ultrasonics, etc.

While the PTFE membranes mentioned above are hydrophobic and can be washed, they also have a high vapor transmission rate, which allows contaminants in the air to quickly and easily diffuse through the membranes into the adsorbent media. PTFE membranes can also be made with very good filtration efficiencies, which is particularly beneficial in the breather filter and adsorbent breather filter applications or where appropriate layers are utilized that allow for good recirculation filtration.

The sorbent core material 15 may comprise any number of materials and forms, which may range from loosely packed particles to filled or highly filled porous materials. As the terms 'sorbent' and 'sorbing' are used herein, they are intended to encompass any material that removes contaminants from surrounding air, whether through a process of absorbing, adsorbing, or otherwise. A core formed of loosely packed particles preferably contains a binder, which holds the particles together. Suitable binders include but are not limited to fluorinated ethylene propylene (FEP), polyvinylidene fluoride (PVDF), PVP (polyvinylpyrilidene), acrylics and other commonly used binders well known in the art. Alternatively, the core can comprise one or more layers of an adsorbent or adsorbent filled material such as a scaffold of porous polymeric material in which void spaces are filled with a sorbent. Other possible core constructions include sorbent impregnated wovens or non-wovens, such as cellulose or polymeric non-woven that may include latex or other binders, as well as porous castings of sorbents and fillers that are polymeric or ceramic. The sorbent core may include a single particle sorbent or may include a mixture of different types of sorbents, the selection of which is dependent on the specific application. The core could also contain a layer or layers of adsorbent beads on a scrim or it could be a tablet of adsorbent materials and binders. The core can also be a woven or nonwoven fabric of carbonized material, such as the (KYNOL) activated carbon fabric products made by American Kynol, Inc.

A preferred embodiment of the sorbent core 15 utilizes a sorbent filled PTFE sheet wherein the sorbent particles are entrapped within the PTFE structure as taught by U.S. Pat. No. 4,985,296 issued to Mortimer, Jr., incorporated herein by reference. Ideally, particles are packed in a multi-modal (e.g., bimodal or tri-modal) manner, with particles of different sizes interspersed around one another to fill as much of the available void space between particles as is possible so as to maximize the amount of active material contained in the core. This technique also allows a number of sorbents to be filled into a single layer.

Using PTFE as a binder material for the core imparts a number of additional advantages. PTFE is a non-linting, non-outgassing inert binder that effectively reduces dusting of sorbent material during manufacturing and during the life of the filter. Additionally, processing advantages of this material include the ability to make a relatively thin, highly loaded material, per U.S. Pat. No. 4,985,296, that can be produced in a wide sheet and then cut (or cut and folded) into desired final widths. In this manner, thin cores can be produced for very low profile sorbent filters.

The sorbent core may also be shaped to contain grooves, bumps, or other features or may include a permeable layer adjacent to the bottom, top, or a side. Such grooves or permeable layers may aid in faster adsorption rates by allowing air and contaminants to more easily diffuse through the grooves or layers to reach the adsorbent core layer.

Perhaps the biggest advantage of using a sorbent filled PTFE core is the core's capacity to achieve high sorbent loading densities. By controlling the sorbent particle sizes and by compression of the extruded sorbent filled PTFE core, very high-density sorbent loadings can be achieved. The PTFE structure still allows vapors to penetrate even very densely packed formulations.

The PTFE/adsorbent composite can be made in thicknesses from less than 0.001" to 0.400" or more. This allows a great deal of flexibility in finished filter thicknesses and adsorbent loading. Additionally, sorbent densities approximating 80-95% of full density are possible with multi-model packing and physical compression, so that maximum adsorbent material can be packed per unit volume. Unlike other binders such as acrylics, melted plastic resins, etc., PTFE does not block the adsorbent pores.

Examples of sorbent materials that may be contained within the core may include: physisorbents (e.g., silica gel, activated carbon, activated alumina, or molecular sieves); chemisorbents (e.g., potassium permanganate, potassium carbonate, sodium carbonate, calcium carbonate, calcium sulfate, powdered metals or other salts or reactants for scavenging gas phase contaminants depending on the known contaminants desired to be removed); ion exchange materials; catalytic fillers; as well as mixtures of some of these materials. For some applications it may be desirable to employ multiple layers of sorbent materials, with each layer containing a different sorbent to selectively remove different contaminants as they pass through the filter.

In each embodiment of the present invention, the sorbent filter may be constructed in virtually any desired dimensions. Even for use within Hard Disk Drives the sizes will vary significantly with the form factor of the drive and the spacing available to place such a filter. Filters for 3.5" Hard Disk Drives may range in size from (length×width×thickness) of from 1 cm×1 cm×0.5 mm or smaller to 10 cm×5 cm×5 cm or larger. Smaller form factor drives or other small enclosures such as cell phones would typically use smaller filters. These will include sizes of 0.5 cm×0.5 cm×0.2 mm and smaller. Conversely, larger enclosures or enclosures that need to withstand more extreme environmental or contamination challenges will be larger. An internal adsorbent volume of down to 0.008 cc to 0.025 cc (or less); and a sorbent core comprising at least 1 mg of sorbent materials can be obtained. Larger adsorbent core volumes are typically easier to make and can thus be almost any volume needed.

With the use of expanded PTFE protective filters covering the sorbent core, preferred thicknesses of the filter are about 0.007 inches to 0.2 inches (0.2 mm to 5 mm).

The invention enables parts to be readily manufactured which are 0.125 mm thick, 3 mm wide and 5 mm long for a total volume of 1.8 mm3. Despite this small size, such a filter may still contain about 500 micrograms or more of sorbent. With a typical sorbent adsorbing 40% to over 100% of its weight in contaminants, a 500 microgram sorbent can sorb 200 to 500 micrograms of contaminants. This should be sufficient to provide substantial protection of an enclosure that is about 2 to 5 cc in total volume or more. But these discussions should not limit the scope of the current invention.

The invention also enables the filters to be placed in a variety of locations within the disk drive. Suggested locations within the disk drive 68 where the filter 70 of the present invention may be mounted include near, under, or over the magnetic storage disk 72, near the ramp load for the read/write head 74, or near the armature 76 as long as it is out of the way mechanically for operation. They can also be placed in small areas within slots or other features used to contain the filter. Gaseous contaminants that may be of concern in this environment include without limitation: dioctylpthalate; chlorine; hydrogen sulfide; nitrous oxide; mineral acid gases; anionic and carbonic species; vapors from silicone; hydrocarbon based cutting oils; and other hydrocarbon and corrosive pollutants as well as moisture.

The adsorbents are disposed on a substrate. For ease of handling, the substrate preferably comprises a polymeric film. The polymer film may be, for example, a polyethylene, polypropylene, polyester, polycarbonate, polyurethane or polyvinyl chloride film. Preferably, the film comprises a polyester film.

The film thickness is dependent upon the filter application and the other materials chosen. For example if the film is a Mylar manufactured by E. I. Dupont Co., films of about 0.0005" thick to about 0.007" thick are preferred. Thinner films can reduce finished filter size somewhat. However, thick films may advantageously increase the rigidity of the filter assembly.

An adhesive can be disposed on the polymer film by, for example, coating, painting, spraying, dipping, laminating, or otherwise applying the adhesive to the layer. In some embodiments, adhesive may be pre-applied on a commercially available film. The film may be an adhesive layer. In this aspect, the film is disposed on a release layer. The release layer is removed prior to filter assembly or installation.

One of skill in the art will appreciate that the adhesive must have a high enough peel strength to withstand the intended application and meet any use specifications that may exist such as high temperature, solvent resistance, FDA approval, repositionable, or low outgassing specifications. For example, a typical low outgassing specification is to pass ASTM E-595-84 specification of less than 1% total mass loss and 0.1% collected volatile condensable material. Thus, in a preferred embodiment, the invention utilizes one layer of 0.0015" (0.0381 cm) thick permanent acrylic pressure sensitive adhesive applied to a first side of a polymeric film and a second layer of permanent acrylic pressure sensitive adhesive 0.0015" (0.0381 cm) thick applied on the second side of the film. The latter adhesive contacts the filter material and adsorbent; the first adhesive is used to join halves of the filter assembly or to attach it to an enclosure.

An alternative embodiment may use only a single layer of transfer adhesive as the substrate. In this embodiment, the adhesive functions both as the substrate for mounting the adsorbent and as the adhesive for joining the filter halves or attaching the filter to the enclosure. These adhesives should have medium to high peel strengths in excess of 20 ounces/inch as measured by PSTC #1 (FTMI) and pass outgassing ASTM E-595-84 specification. Suitable transfer adhesives are commercially available from a number of sources.

Figure 1B:
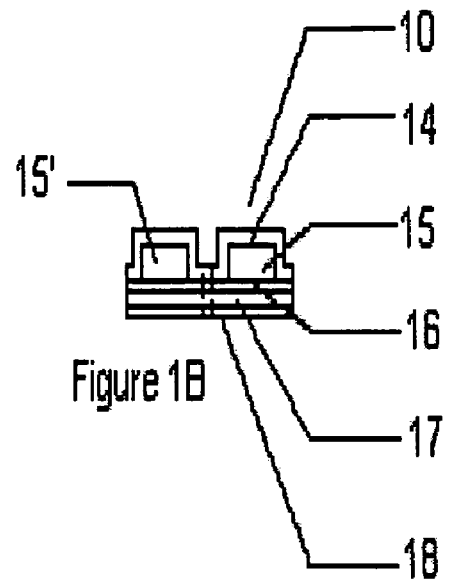
FIG. 1B is a side view of the embodiment shown in FIG. 1A.
Figure 1C:
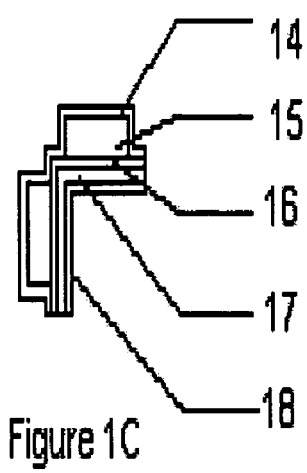
FIG. 1C is a side view of the embodiment shown in FIG. 1B when it has been folded at a 90 degree angle along the hinge line.

With reference to FIG. 1B, the hinged adsorbent assembly (10) may be assembled as follows. A significant advantage of the hinged adsorbent according to the present invention is that, while providing an increase in adsorbent capacity, assembly of these sorbent filters is compatible with efficient rotary-die manufacturing processes.

The polymer film (17) is provided as a double sided adhesive tape having adhesive layers (16 and 18) on opposite sides. The film is cut to a rectangular shape and has an axis of symmetry bisecting it. Two adsorbents (15, 15') are placed on the film on opposite sides of and symmetric about the axis. Each adsorbent has a surface in contact with the adhesive such that the adsorbents are bonded to the film.

The adsorbents are covered with a porous polymeric filter media (14). The filter media covers the remaining surfaces of the adsorbents to form two adsorbent units. The filter media is bonded to the film by the exposed pressure sensitive adhesive around the perimeter of the adsorbents. The adsorbents are thus encapsulated between the polymer film to form two adsorbent units that are symmetrical about the axis of symmetry.

Figure 3A:
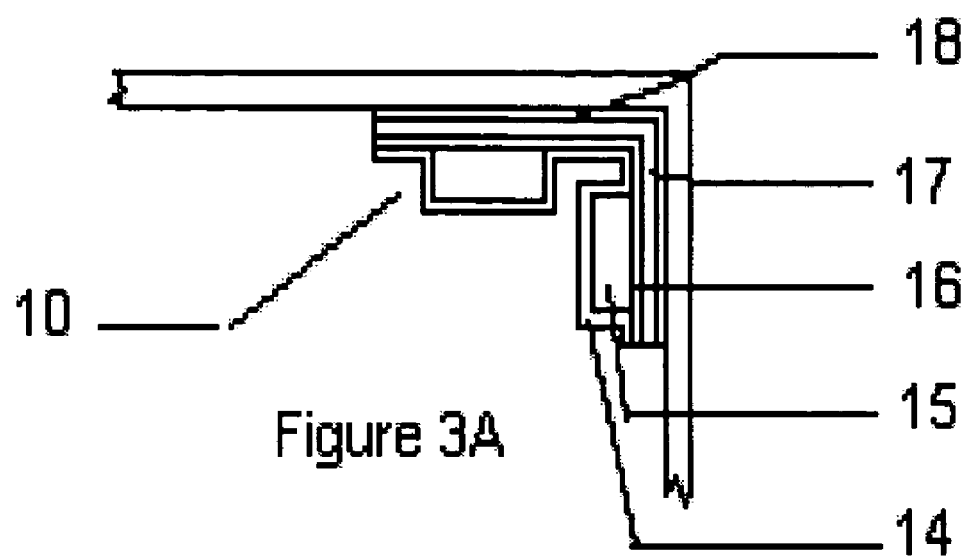
FIG. 3A is a side view of a third embodiment of the adsorbent assembly filter unit of the present invention, which is shown here folded about the hinge line and applied to a three dimensional structure such as but not limited to the corner of an enclosure.

As shown in FIG. 1A, the film and the filter media include perforations along the axis of symmetry. The perforations create a hinged connection 13 between the two adsorbent units 11 and 12. The foldably connected assembly may be installed in a variety of configurations. For example, the assembly can be mounted in a corner of an enclosure with each adsorbent unit being attached to a side of the enclosure as depicted in FIG. 3A.

Figure 3B:
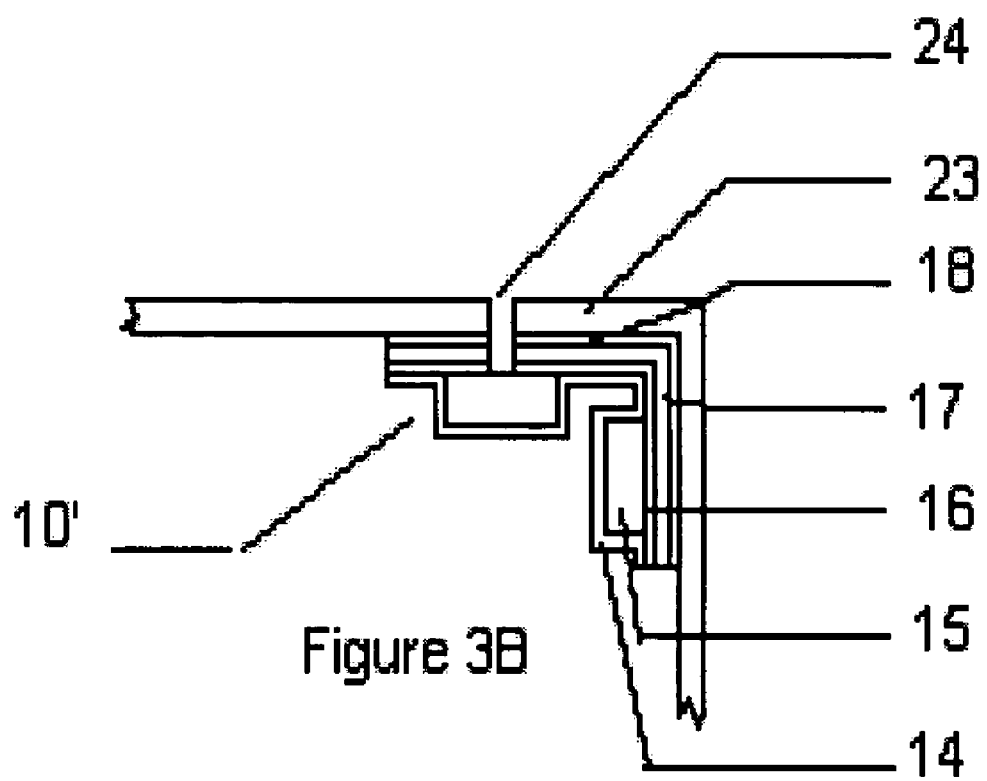
FIG. 3B is a side view of a fourth embodiment of the adsorbent breather filter unit of the present invention as it can be folded about the hinge line and applied to an enclosure over a vent hole.
Figure 10:
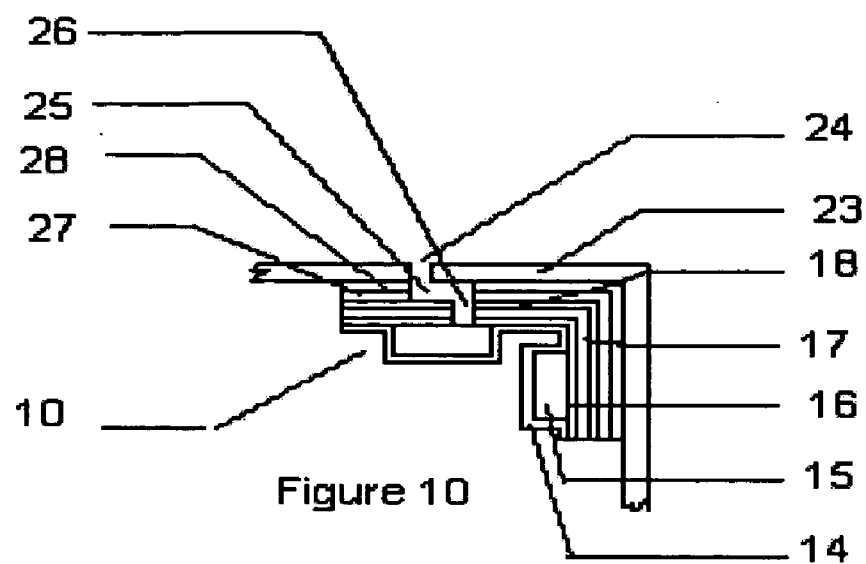
FIG. 10 is a side view of the eleventh embodiment of the present invention where a diffusion tube can be added to the adsorbent breather filter shown in FIG. 3B.

In FIG. 3B, one of the adsorbent units, illustrated by filter 10', may include a hole within the film, which hole can be aligned with a breather port (24) in an enclosure wall (23) to allow the adsorbent unit to function as an adsorbent breather. Alternatively, the adsorbent assembly aligned with the breather port may incorporate a diffusion tube within the layers as shown in FIG. 10. Incorporation of a diffusion tube increases filter functionality. In this embodiment, the hole 26 through the adhesive layers aligns with one end of slot 25 through additional layers 27 and 28 which can be a single sided adhesive (adhesive layer 28 on a polyester layer 27), where the opposite side of slot 25 aligns with the vent hole 24 in the enclosure wall 23.

Figure 8:
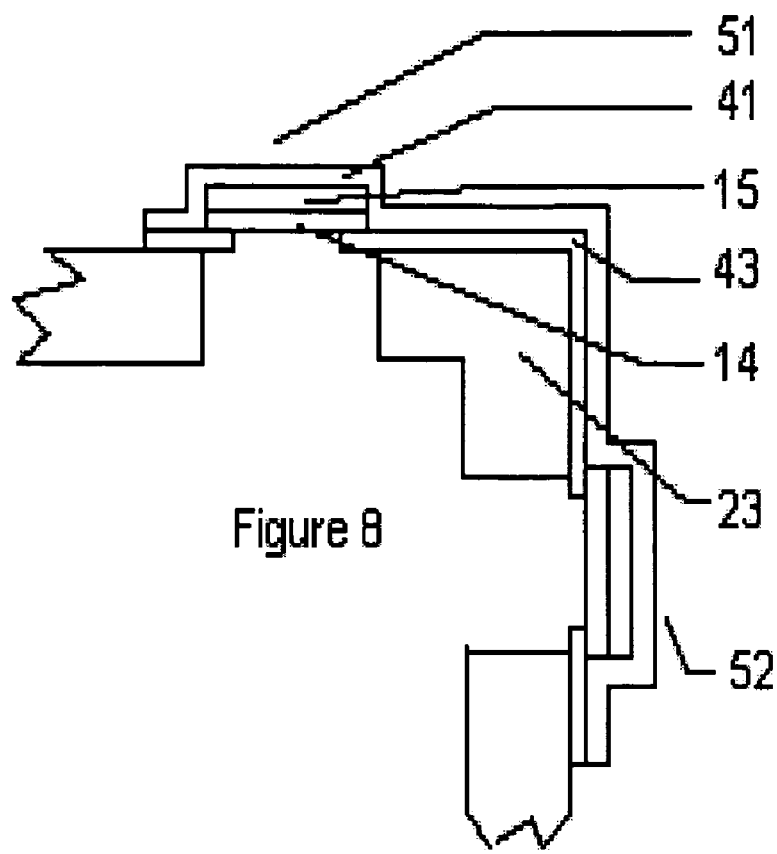
FIG. 8 is a side view of a ninth embodiment of the present invention where the adsorbent assembly is mounted on the outside of the enclosure. It can be flush mounted as shown or not.
Figure 9:
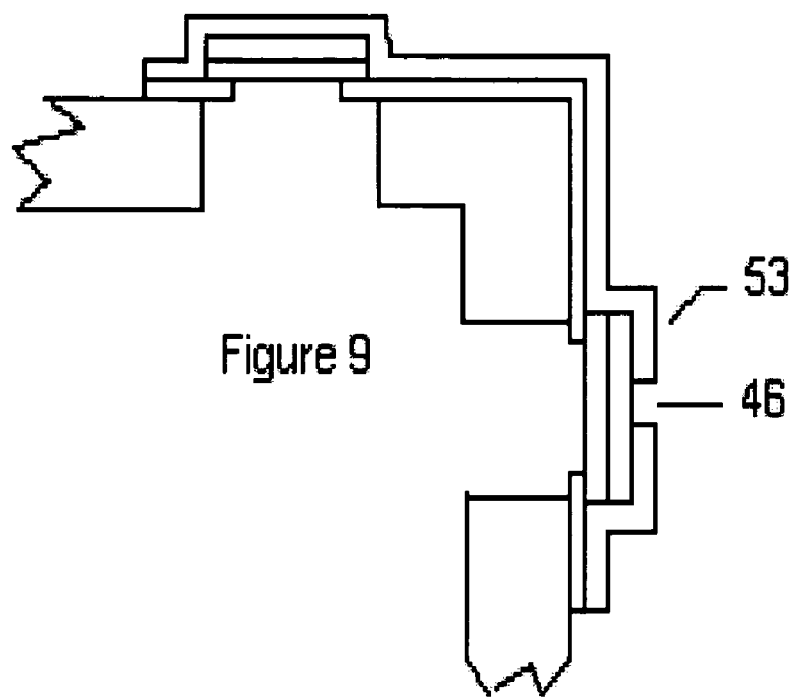
FIG. 9 is a side view of the tenth embodiment of the present invention where the adsorbent breather filter is mounted on the outside of the enclosure. It can also be flush mounted as shown or not.
Figure 11:
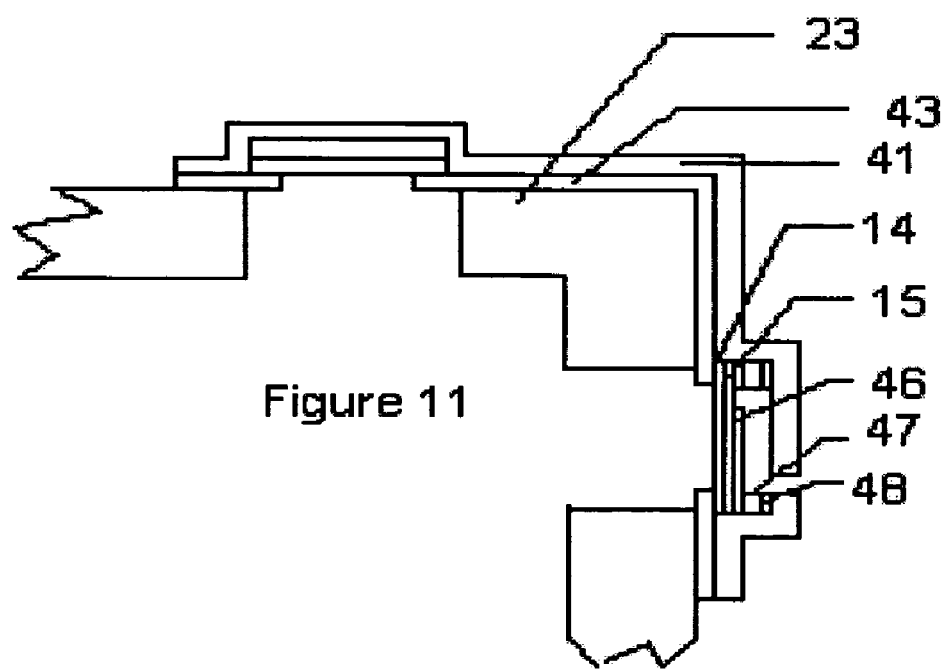
FIG. 11 is a side view of the twelfth embodiment of the present invention where a diffusion tube can be added to the outside mount adsorbent breather filter shown in FIG. 9.

In another alternative embodiment, shown in FIG. 8, the hinged adsorbent assembly includes a nonpermeable layer 41 and is mounted from the outside such as around a corner such as partially on the lid and partially on the side of the enclosure. Here adhesive layer 43 is used to secure the filter to the enclosure wall and filter sections 51 and 52 access the inside of the enclosure through holes in the enclosure wall 23. These filters may also incorporate hole 46 within the air-impermeable layer to function as an outside mount adsorbent breather filter as depicted in FIG. 9. Here the filter section 53 is identified as the active adsorbent breather section of the filter unit. These outside mount adsorbent breather filters may also incorporate a diffusion tube as illustrated in FIG. 11 with adhesive layer 46, poly layer 47 and adhesive layer 48 to improve performance and functionality.

Figure 1D:
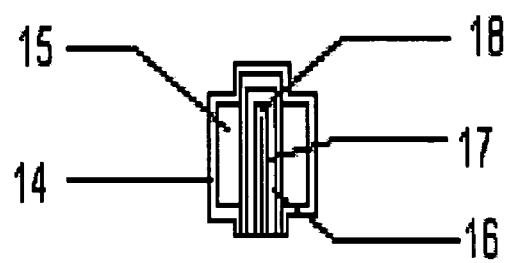
FIG. 1D is a side view of the embodiment in FIG. 1B when it has been folded at a 180 degree angle or back over upon itself along the hinge line
Figure 1E:
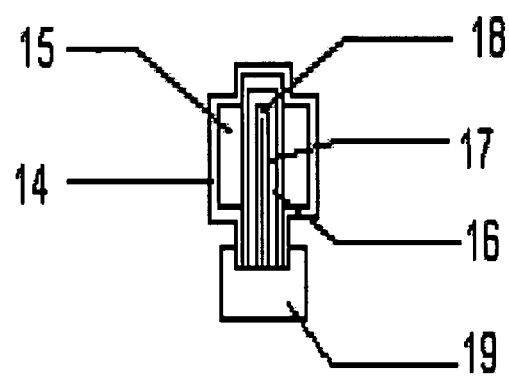
FIG. 1E is a side view of the embodiment in FIG. 1D further equipped with an end-cap 19 that can hold the part together or can be used to help hold the filter in place.

Preferably, the adsorbent assembly is folded about the axis of symmetry such that the adhesives (18) of two assemblies are brought into contact as illustrated in FIG. 1D. In this way, a compact adsorbent filter can be constructed with high adsorbent capacity with efficient continuous feed rotary die cutting equipment. Moreover, the adsorbent filter is symmetric, so it does not require a specific orientation during assembly with the enclosure.

Figure 2A:
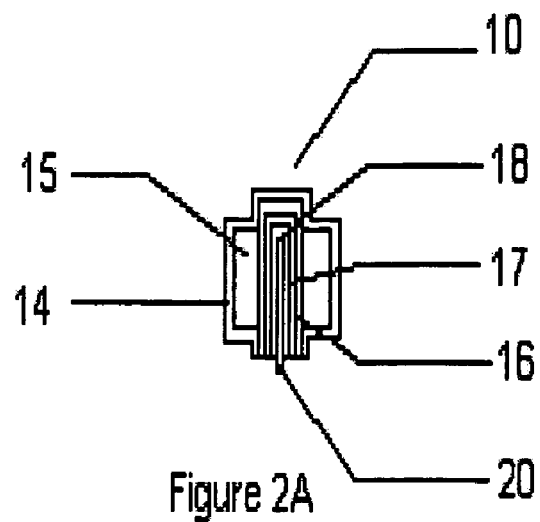
FIG. 2A is a cross-section view of a second embodiment of the present invention that includes an additional layer 20 that can be placed between adhesive layer 18 as the part is folded.
Figure 2B:
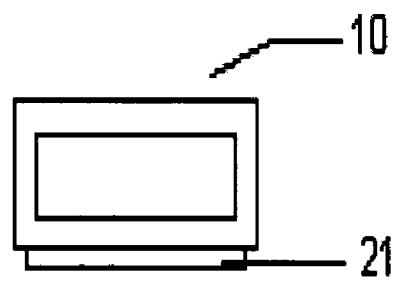
FIG. 2B is a side view of the embodiment in FIG. 2A where the extra layer (here labeled as layer 21) extends beyond the folded layers in one direction.
Figure 2C:
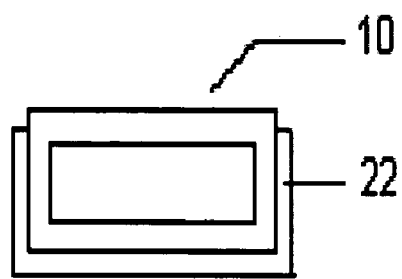
FIG. 2C is a side view of the embodiment in FIG. 2A where the extra layer (here labeled as layer 22) extends out beyond the folded layers in three directions.
Figure 2D:
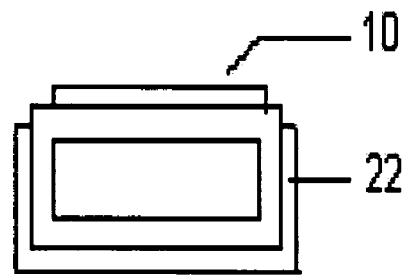
FIG. 2D is a side view of the embodiment of FIG. 2A where the extra layer (here again labeled as layer 22) extends through a slit in the hinged side to extend beyond the folded layers in all four directions.

Alternatively, a sheet 20 may be inserted between the two folded halves as illustrated in FIG. 2A. This sheet may extend out on one side as illustrated in FIG. 2B by extended side 21. Two or more edges of the inserted sheet may extend from the adsorbent assembly. In FIG. 2B, the sheet extends at one edge opposite the hinge. In FIG. 2C the sheet extends on three edges. The hinge could also be slotted to allow the sheet to be inserted and extend on four sides as illustrated in FIG. 2D. This added sheet is useful for several reasons: it can stiffen the part if desired; it can extend an adhesive free area or zone on the sides it extends from; and it could also be thin and flexible to allow a spring loading of the part within C-channel type devices used to hold the part within an enclosure.

Figure 4:
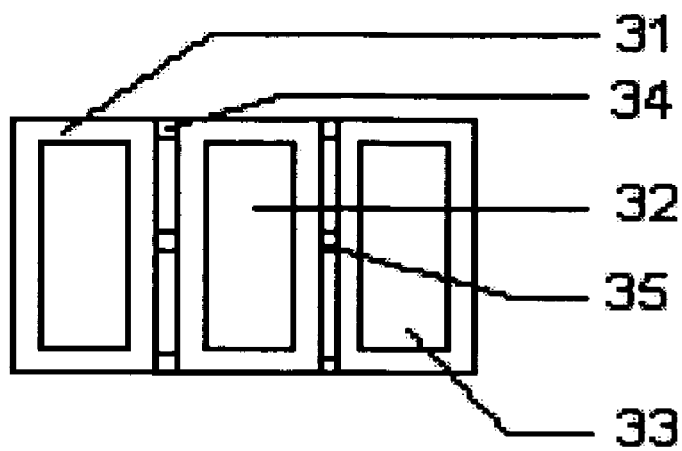
FIG. 4 is a top view of a fifth embodiment of the filter unit of the present invention having three sections foldably connected.
Figure 12:
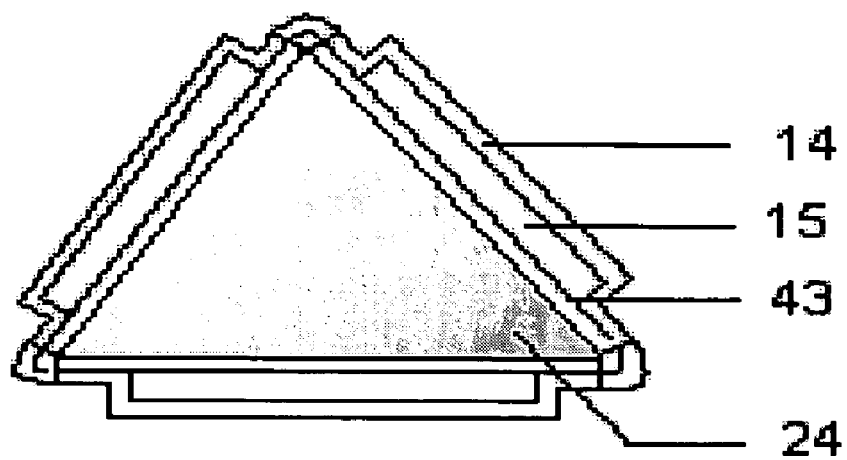
FIG. 12 is a side view of the thirteenth embodiment of the present invention where a three-sectioned adsorbent assembly similar to FIG. 4 can be mounted to a triangular post.
Figure 14:
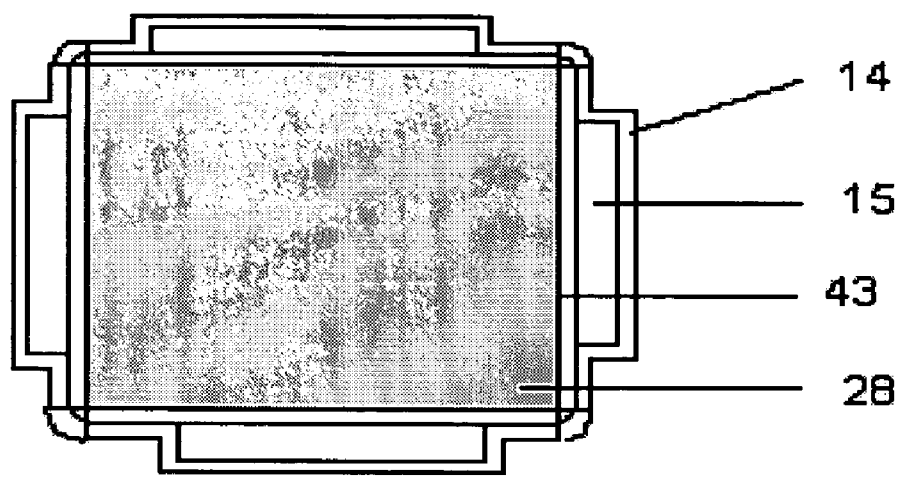
FIG. 14 is a side view of the fifteenth embodiment of the present invention where a four-sectioned adsorbent assembly can be mounted to a square or rectangular post.

Alternatively the hinged adsorbent assembly may contain more than two adsorbent assemblies foldably connected. The filter illustrated in FIG. 4 consists of three adsorbent assemblies (31, 32 and 33) connected with hinges (34 and 35). These multiple adsorbent assemblies may be folded around any feature such as a triangular post 24 or rectangular post 28 as illustrated in FIGS. 12 and 14 respectively or around and back unto itself.

Figure 13:
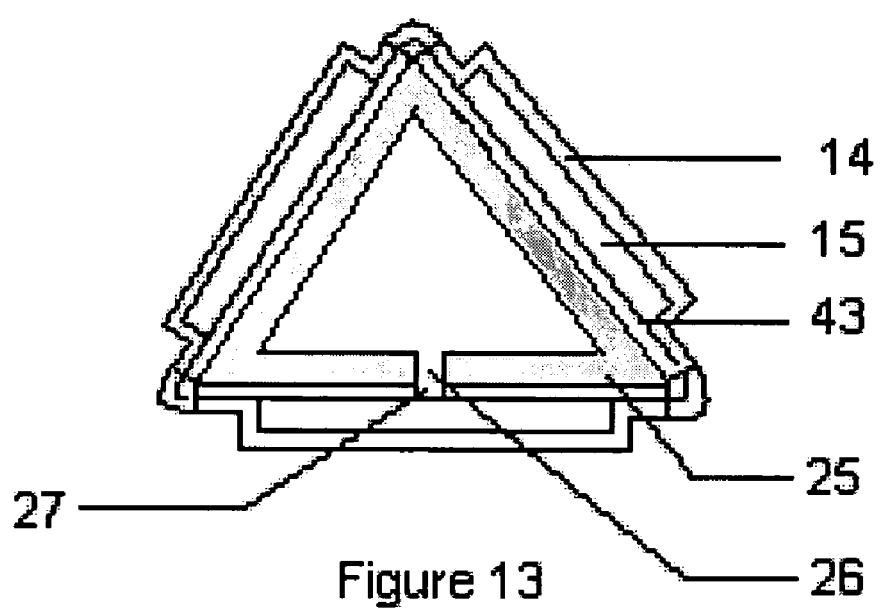
FIG. 13 is a side view of the fourteenth embodiment of the present invention where a three-sectioned adsorbent breather filter could be mounted to a triangular hollow post vented to the outside.
Figure 15:
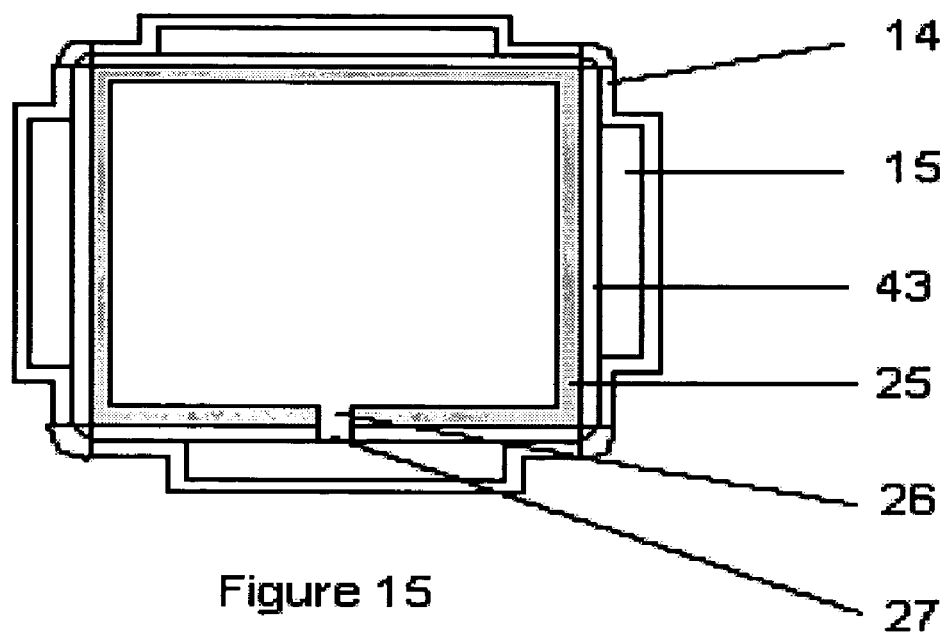
FIG. 15 is a side view of the sixteenth embodiment of the present invention where a four sectioned adsorbent breather filter can be mounted to a square or rectangular hollow post vented to the outside.

The multiple sectioned hinged adsorbent may also include a hole 27 through the adhesive layer 43 and align with a hole 26 in a hollow post 25 that vents to outside the enclosure as illustrated in FIGS. 13 and 15.

Figure 5:
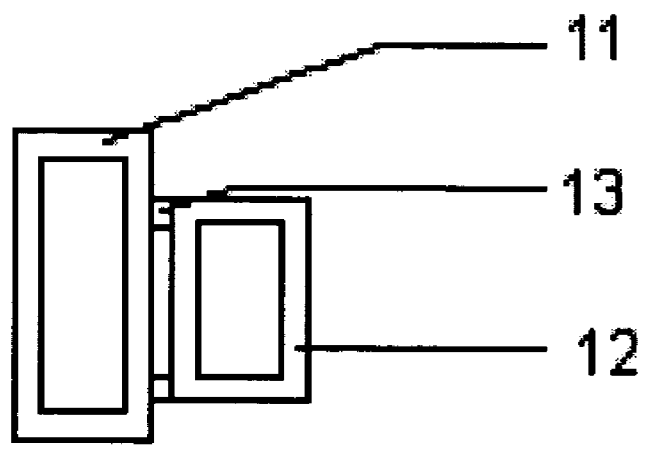
FIG. 5 is a top view of the sixth embodiment of the present invention that can have unequal sides about the hinge line.

The sections of the foldably connected adsorbent filter also need not be the same shape or size as illustrated in FIG. 5.

Figure 6:
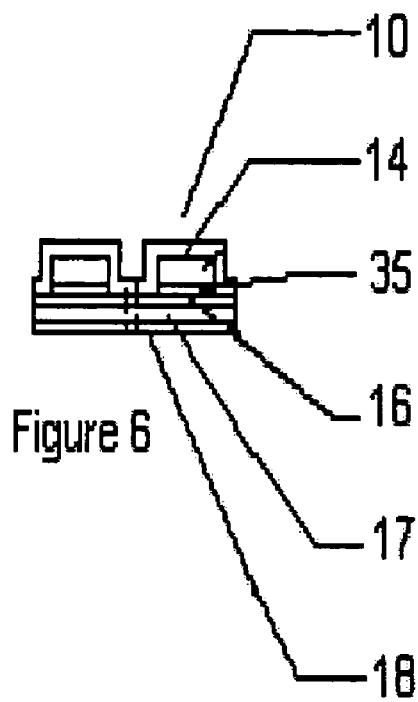
FIG. 6 is a side view of the seventh embodiment of the present invention where an extra air permeable flow layer or grooves can be added to the underside of the adsorbent layer to allow more access to the surface areas of the adsorbent for faster adsorption rate pickup.
Figure 7:
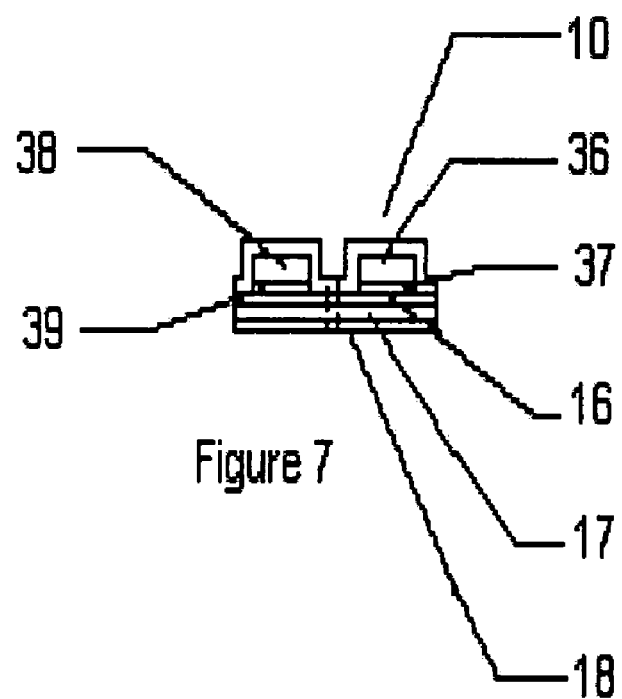
FIG. 7 is a side view of an eighth embodiment of the present invention where the adsorbent layers on either side of the hinged layer are dissimilar in either size, composition, or density.

The adsorbent filter may also include an air permeable flow layer 35 to increase adsorption rate by improving access to the backside of the adsorbent as illustrated in FIG. 6. Further, the two adsorbent assemblies may use different adsorbents 38 and 36 with different flow layers 39 and 37 respectively as illustrated in FIG. 7. The adsorbent may be multi-layered with dissimilar numbers of layers per section and may contain air permeable flow layers between the adsorbent layers or they may be shaped to include grooves within the adsorbent instead of flow layers. Additionally, a hole may be used in the adhesive layers in filters utilizing flow layers or grooves to work as adsorbent breather filters where the layers and/or grooves may help increase airflow through the filter.

Figure 16A:
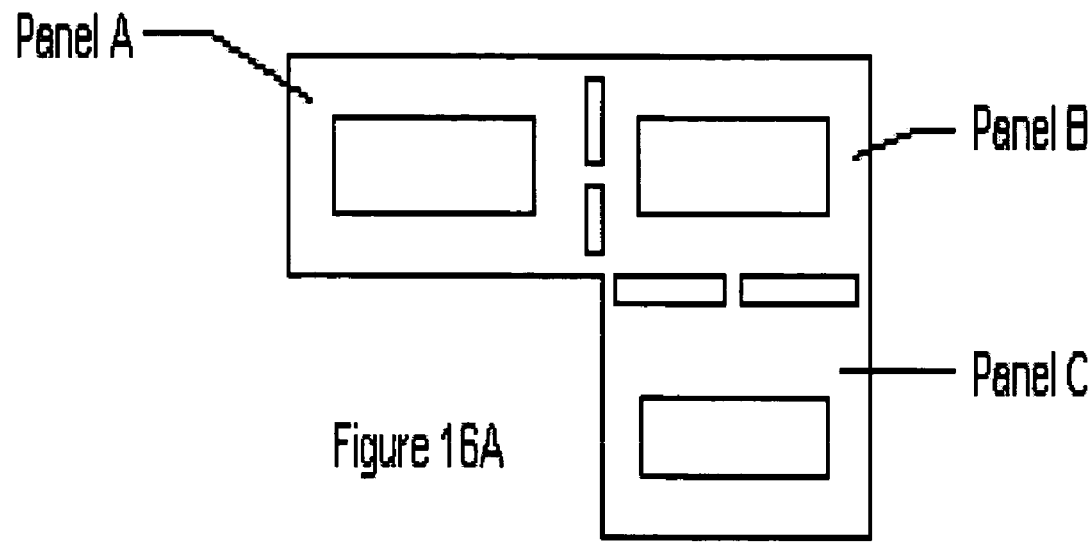
FIGS. 16A and 16B are a top view and side view respectively of the seventeenth embodiment of the present invention of a three panel or double hinged adsorbent assembly filter that will attach to three sides or surfaces of an enclosure, such as two sides and a bottom; two sides and a top; top, bottom and a side; or possible alternate internal surfaces.
Figure 16B:
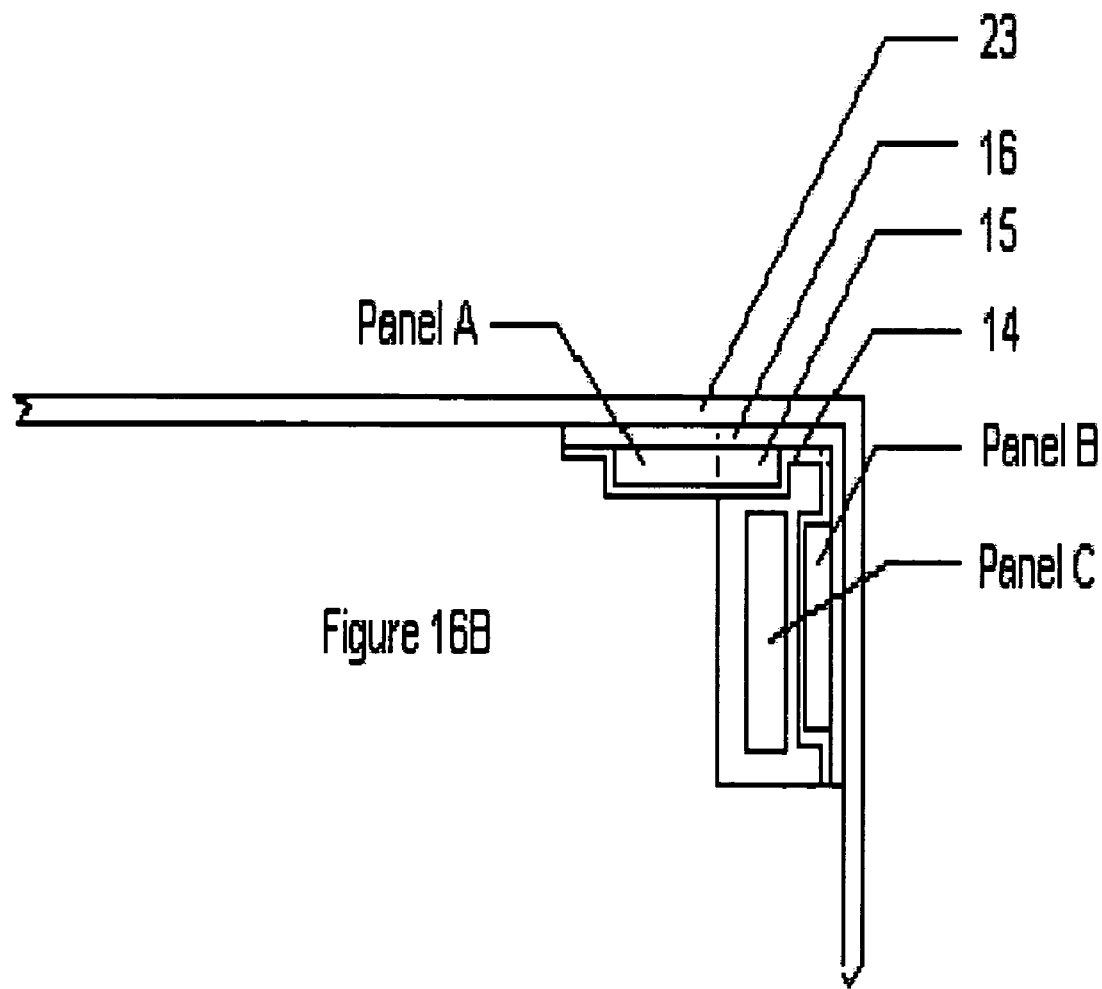
Figure 17A:
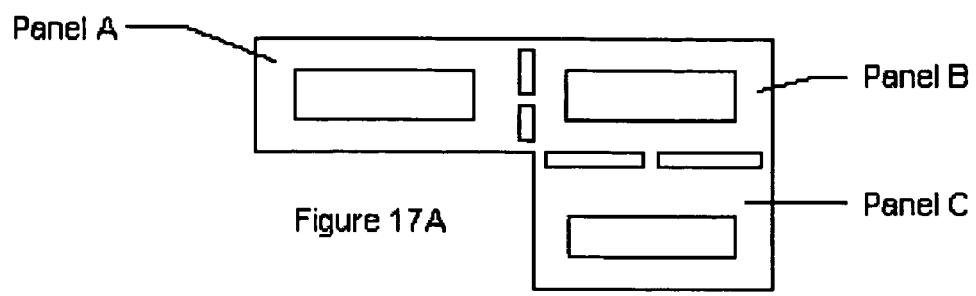
FIGS. 17A and 17B are a top view and side view respectively of the eighteenth embodiment of the present invention of a three panel or double hinged adsorbent breather filter that will attach to three sides or surfaces of an enclosure.
Figure 17B:
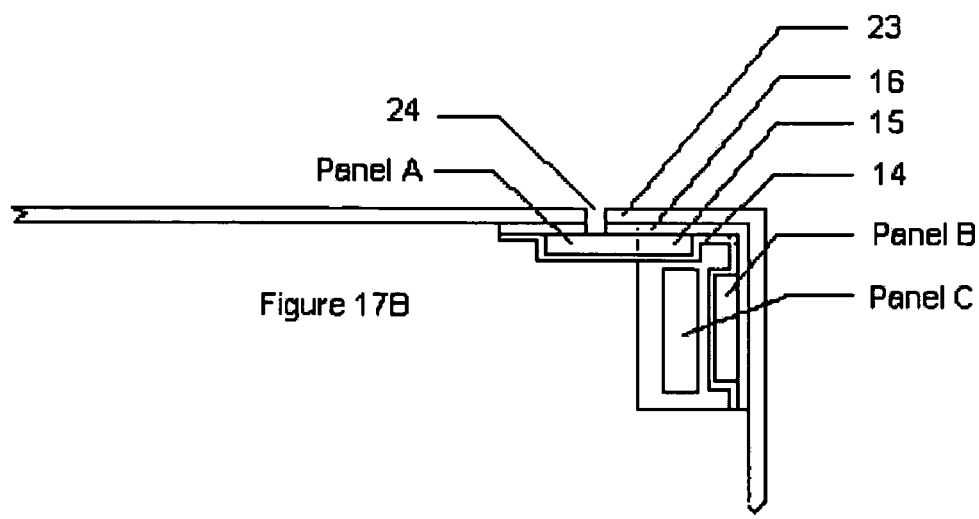

The hinged adsorbent filter may have multiple adsorbent assemblies that mount to multiple surfaces other than described earlier such as illustrated in FIGS. 16A and 16B. Here, the filter has adsorbent assemblies A, B, and C that can mount to three surfaces perpendicular to each other such as two sides and a bottom, two sides and a top, a top bottom and side, or other surfaces or walls that may exist within the enclosure. Further these surfaces need not be perpendicular to each other, but can be of any slope or configuration. These filters may also include a hole through the adhesive layer and/or layers and mount over a hole in the enclosure to operate as an adsorbent breather filter as illustrated in FIGS. 17A and 17B. Here again diffusion tubes can be incorporated. Also, outside mount configurations can be employed.

Figure 19A:
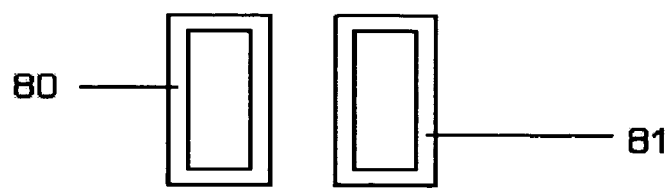
FIGS. 19A and 19B show a top and side view respectively of the nineteenth embodiment of the present invention where the two adsorbent assemblies are separated as mirrored discrete parts as shown in 19A and assembled as shown in FIG. 19B with the adhesive layers in contact.
Figure 19B:
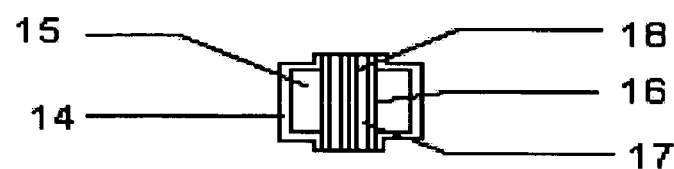
Figure 20A:
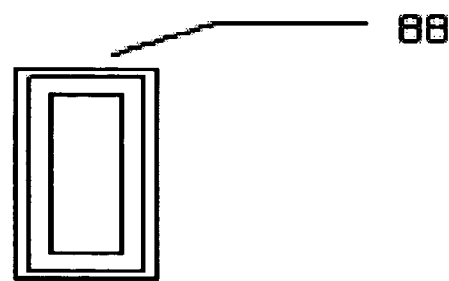
FIGS. 20A and 20B show a top and side view respectively of the twentieth embodiment of the present invention where the two adsorbent assemblies as shown in FIG. 19A are assembled with another substrate layer. The substrate layer can be a stiffening layer or be a spring layer or a layer that holds the edges of the adhesive layers from the edges of the part. It can extend beyond the discrete parts in up to four sides.
Figure 20B:
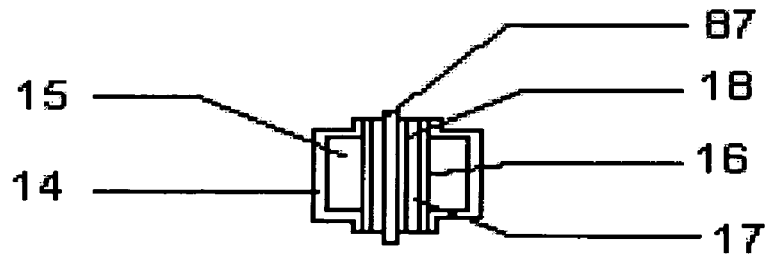

The adsorbent assembly filter can even be separated along the hinge into two discrete parts 80 and 81 that may be mirrored as illustrated in FIG. 19A and further assembled into a single unit as shown in FIG. 19B. Further an additional layer 87 may be inserted between the two parts 80 and 81 as shown in top and side views in FIGS. 20A and 20B respectively. The additional layer 87 may be used as a stiffening element or it can be a thin layer used as a spring to help spring load the assembly into a slot. The added layer can also be used to keep adhesive edges from the individual parts 80 and 81 from reaching the edges of the final assembled filter.

Figure 18:
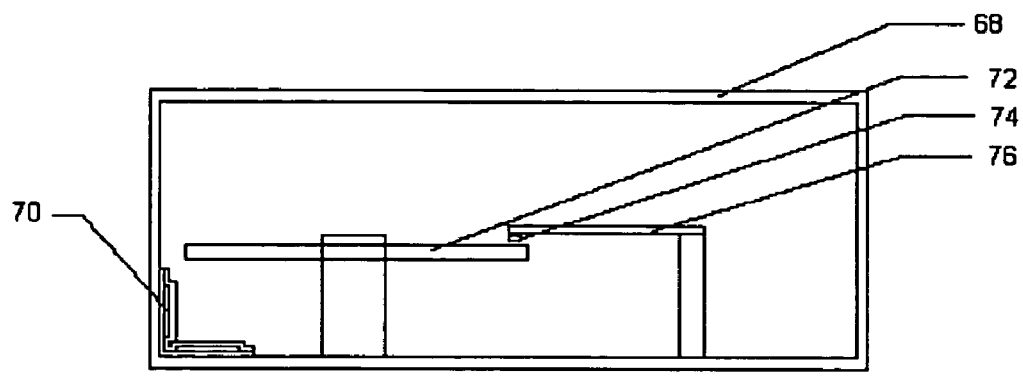
FIG. 18 shows a side view of a computer hard disk drive with the filter in place.

FIG. 18 shows a simplified view of a computer hard disk drive 68 with the filter 70 installed. It also shows relative locations of the disk 72, read/write head 74 and actuator arm 76.

Different materials can be used for the various constructions. For example the air-impermeable layers used in FIGS. 8, 9, and 11 may be a polymer layer such as a polyester, polypropylene, or polyethylene. They could also be a metalized polymer film. More preferably they could be a layer of aluminum and even more preferably a layer of conformable dead soft aluminum as they are conformable and provide good electromagnetic shielding. An example could be a 0.003" thick dead soft aluminum as sold by ALL FOILS in Brooklyn Heights, Ohio.

EXAMPLES

Without intending to limit the scope of the present invention, the following examples illustrate how the present invention may be made and used:

Example 1

An adsorbent assembly was made having the following features. A polyester film or sheet having a thickness of 0.003 inches was coated with an adhesive on two sides. The adhesive was 0.0015 inch thick high temperature acrylic pressure sensitive adhesive. This double sided adhesive construction is available from Adhesives Research company in Glenn Rock Pa.

A 70 wt % activated carbon and 30 wt % PTFE adsorbent core was made by in accordance to U.S. Pat. No. 4,985,296:

The polymeric filter membrane was provided comprising expanded porous PTFE membrane having a 0.2 micron rating as made and supplied by W. L. Gore and Associates, Inc. Newark, Del.

Two adsorbent pieces were cut and placed on the adhesive coated polyester sheet equidistant from the location of the intended fold line. The porous polymeric membrane was pressed over the adsorbents and adhered to the adhesive on the polyester film around the perimeter of each adsorbent. A perforation was made along the fold line to form two foldably connected adsorbent assemblies.

The resulting foldably connected adsorbent assemblies were then folded upon each other so that the exposed adhesive on the polyester film of the first assembly contacted the exposed adhesive on the polyester film of the second assembly. The assemblies were pressed together by hand for 5 seconds.

The resulting adsorbent assembly measured approximately 1.0 inches long (2.54 cm) by approximately 0.55 inches wide (1.4 cm) by approximately 0.10 inches thick (0.25 cm) and contained about 95 mg of activated carbon.

In summary, the present invention provides a relatively thick sorbent filter assembly that is easy to manufacture, low particulating, low outgassing, compact, manufacturable in small sizes, and is able to hold proportionately large amounts of densely packed sorbent material.

Although the above description was primarily directed to the production of a filter for use in a computer disk drive application, the present invention can be used in many other applications, for example, electronic control boxes, automobiles, optical equipment, optical cable, cell phones, optical drives, etc. Basically anywhere an enclosure needs to control humidity, corrosive gasses, or volatile organic vapors can use the present invention as it can cheaply deliver a significant amount of adsorbent in relatively small package in high commercial volumes.

While particular embodiments of the present invention have been illustrated and described herein, the present invention should not be limited to such illustrations and descriptions. It should be apparent that changes and modifications may be incorporated and embodied as part of the present invention within the scope of the following claims.

We claim:

1. An article comprising:
   a) a first adsorbent assembly comprising a first adsorbent disposed on a first substrate and a first porous polymeric layer covering at least a portion of said first adsorbent, the first porous polymeric layer attached to the first substrate around the perimeter of the first adsorbent; and
   b) a second adsorbent assembly comprising a second adsorbent disposed on a second substrate and a second porous polymeric layer covering at least a portion of said second adsorbent, the second porous polymeric layer attached to the second substrate around the perimeter of the second adsorbent;
   in which said first adsorbent assembly and said second adsorbent assembly are foldably connected and symmetric about the fold line.

2. The article of claim 1, further comprising a fold line between the first and second adsorbent assemblies.

3. The article of claim 2, in which the article is folded along the fold line.

4. The article of claim 2, further comprising a laminar support, said laminar support having at least one edge, a first side and a second side opposite the first side, wherein the article is folded along the fold line about an edge of the laminar support such that the first adsorbent assembly is adjacent to said first side of the laminar support and the second adsorbent assembly is adjacent to said second side of the laminar support.

5. The article of claim 4, in which at least one edge of said laminar support is exposed.

6. The article of claim 4, in which the laminar support further comprises an adhesive on at least one side.

7. The article of claim 2, in which the article is folded along the fold line such that the first substrate is adjacent to the second substrate.

8. The article of claim 7, further comprising a clamp for fastening the first adsorbent assembly to the second adsorbent assembly.

9. The article of claim 1, in which the first substrate and the second substrate are continuous.

10. The article of claim 1, in which the first porous polymeric layer and the second porous polymeric layer are continuous.

11. The article of claim 1, in which at least one of the first substrate and the second substrate comprises an adhesive disposed on at least one side.

12. The article of claim 11, wherein the article is folded such that the first substrate is adjacent to the second substrate and at least a portion of said adhesive is exposed.

13. The article of claim 11, wherein the adhesive is selected from the group consisting of: pressure sensitive adhesives, hot melt adhesives, thermoplastic or thermoset materials, UV curable adhesives, air curable adhesives, moisture curable adhesives, and multiple-part adhesives.

14. The article of claim 1, in which at least one of the first substrate and the second substrate comprises double sided adhesive tape.

15. The article of claim 1, in which the first adsorbent assembly further comprises a hole within the first substrate.

16. The article of claim 15, in which the first adsorbent assembly further comprises a diffusion tube disposed over the hole.

17. The article of claim 15, further comprising an air-impermeable layer covering the porous polymeric layers.

18. The article of claim 17, further comprising at least one perforation within said air-impermeable layer.

19. The article of claim 1, in which at least one of the first porous polymeric layer and the second porous polymeric layer is a porous polymeric membrane.

20. The article of claim 19, where the porous polymeric membrane comprises PTFE.

21. The article of claim 1, in which at least one of the first porous polymeric layer and the second porous polymeric layer is a laminate comprising a porous polymeric membrane and a support.

22. The article of claim 21, where the porous polymeric membrane comprises PTFE.

23. The article of claim 1, in which at least one of the first adsorbent and the second adsorbent comprises a chemisorbent.

24. The article of claim 1, in which at least one of the first adsorbent and the second adsorbent comprises a physisorbent.

25. The article of claim 1, in which the first adsorbent and the second adsorbent comprise the same material.

26. The article of claim 1, further comprising at least one additional adsorbent assembly comprising at least one additional adsorbent disposed on at least one additional substrate and at least one additional porous polymeric layer covering at least a portion of said at least one additional adsorbent, the at least one additional porous polymeric layer attached to the at least one additional substrate around the perimeter of the at least one additional adsorbent, wherein the at least one additional adsorbent assembly is foldably connected to the first or second adsorbent assembly.

27. An enclosure having at least one corner, said enclosure comprising the article of claim 2, said article folded along said fold line and attached to said corner of said enclosure.

28. An enclosure having a hole, said hole covered by the article of claim 16.

29. The article of claim 1, wherein the adsorbent is shaped on at least one surface.

30. The article of claim 1, wherein the adsorbent further comprises at least one air permeable flow layer.

31. The article of claim 1, where the adsorbent comprises a polymer layer filled with an adsorbent.

32. The article of claim 31, where the adsorbent is a composite, said composite comprising adsorbent and PTFE.

33. The article of claim 1, where at least one adsorbent may comprises two or more adsorbent materials.

34. The article of claim 1, where at least one adsorbent comprises two or more layers of adsorbent material.

35. An adsorbent assembly comprising:
a) a rectangular pressure sensitive adhesive layer having an axis of symmetry bisecting said pressure sensitive adhesive layer into a first half and a second half;
b) first adsorbent having a first surface in contact with the first half of said pressure sensitive adhesive layer, said first adsorbent having at least one remaining surface;
c) a second adsorbent having a first surface in contact with the second half of said pressure sensitive adhesive layer, said second adsorbent having at least one remaining surface the first adsorbent and the second adsorbent being symmetric about the axis of symmetry;
d) a porous polymeric membrane filtration media comprising ePTFE attached to the pressure sensitive adhesive layer around the perimeter of the first adsorbent and the second adsorbent such that said polymeric membrane filtration media covers said remaining surfaces of the first adsorbent to form a first adsorbent unit and said polymeric membrane filtration media covers said remaining surfaces of the second adsorbent to form a second adsorbent unit; and
e) at least one perforation disposed along the axis of symmetry such that the first adsorbent unit is foldably connected to the second adsorbent unit.

36. A method of assembling an adsorbent article comprising the steps of:
a) providing a substrate having a top surface and a bottom surface, said substrate having a fold line therein to form a first panel having a top surface and a bottom surface and a second panel having a top surface and a bottom surface, the first panel foldably connected to the second panel and symmetric about the fold line;
b) providing a first adsorbent disposed on the top surface of the first panel and a second adsorbent disposed on the top surface of the second panel;
c) covering at least a portion of the first adsorbent with a first porous polymeric layer, said first porous polymeric layer being attached to the top surface of the first panel around the perimeter of the first adsorbent;
d) covering at least a portion of the second adsorbent with a second porous polymeric layer, said second porous polymeric layer being attached to the top surface of the second panel around the perimeter of the second adsorbent; and
e) folding the substrate at the fold line such that the bottom of the first panel is adjacent to the bottom of the second panel.

37. The method assembling an adsorbent article of claim 36, in which the first porous polymeric layer and the second porous polymeric layer are continuous.

38. The method of assembling an adsorbent article of claim 36, further comprising the step of covering the first and second porous polymeric layer with an air-impermeable layer.

* * * * *